United States Patent

Ryczek

[11] 3,844,632
[45] Oct. 29, 1974

[54] TILTING GRAIN BIN UNLOADER
[75] Inventor: William G. Ryczek, Kansas City, Mo.
[73] Assignee: Allis-Chalmers Corporation, Milwaukee, Wis.
[22] Filed: Apr. 9, 1973
[21] Appl. No.: 349,563

Related U.S. Application Data
[62] Division of Ser. No. 260,740, June 8, 1972, Pat. No. 3,771,676.

[52] U.S. Cl. .............................................. 308/191
[51] Int. Cl. .......................................... F16c 33/64
[58] Field of Search .......... 308/230, 190, 191, 192, 308/193, 196

[56] References Cited
UNITED STATES PATENTS
2,759,243   8/1956   Smith .................................. 308/196
3,309,157   3/1967   Schlueter ............................ 308/230
3,387,900   6/1968   Morrison ............................ 308/196

Primary Examiner—Charles J. Myhre
Assistant Examiner—Frank Susko
Attorney, Agent, or Firm—Kenneth C. McKivett

[57] ABSTRACT

This disclosure relates to a power-operated swingable auger conveyor which can be moved from operative discharge position to an inoperative position without the operator leaving his station on the combine and wherein the bearing races forming the support of such conveyor are constructed of hot rolled steel bar which coact with commercial grade balls to provide an economical mounting.

7 Claims, 6 Drawing Figures

TILTING GRAIN BIN UNLOADER

This is a division, of application Ser. No. 260,740 filed June 8, 1972 now U.S. Pat. No. 3,771,676.

This invention generally relates to combined harvester threshers, and it is more particularly concerned with the provision of an improved auger-type conveying system for unloading threshed material from a storage bin which is mounted on and forms part of the machine.

More particularly, this invention is concerned with an improved bearing construction for swingably mounting an auger conveyer on a combine harvester grain bin.

This invention is concerned with an improved bearing construction adapted to be used in the conveyer shown and described in my U.S. Pat. No. 3,638,812 which issued Feb. 1, 1972.

It is an object of this invention to provide a reasonably priced bearing for a slow-moving, intermittently used construction.

A further object of this invention is to provide a bearing easily manufactured and assembled from relatively inexpensive parts adapted for use in moving an auger-type conveyer extension to a desirable and convenient position for storage and/or transport position.

The foregoing and other important objects and desirable features inherent in and encompassed by the invention will become apparent from the following detailed description and accompanying sheets of drawings in which:

FIG. 6 is a vertical section view similar to FIGS. 3 and 4 showing the ball loading arrangement.

Figure 1:
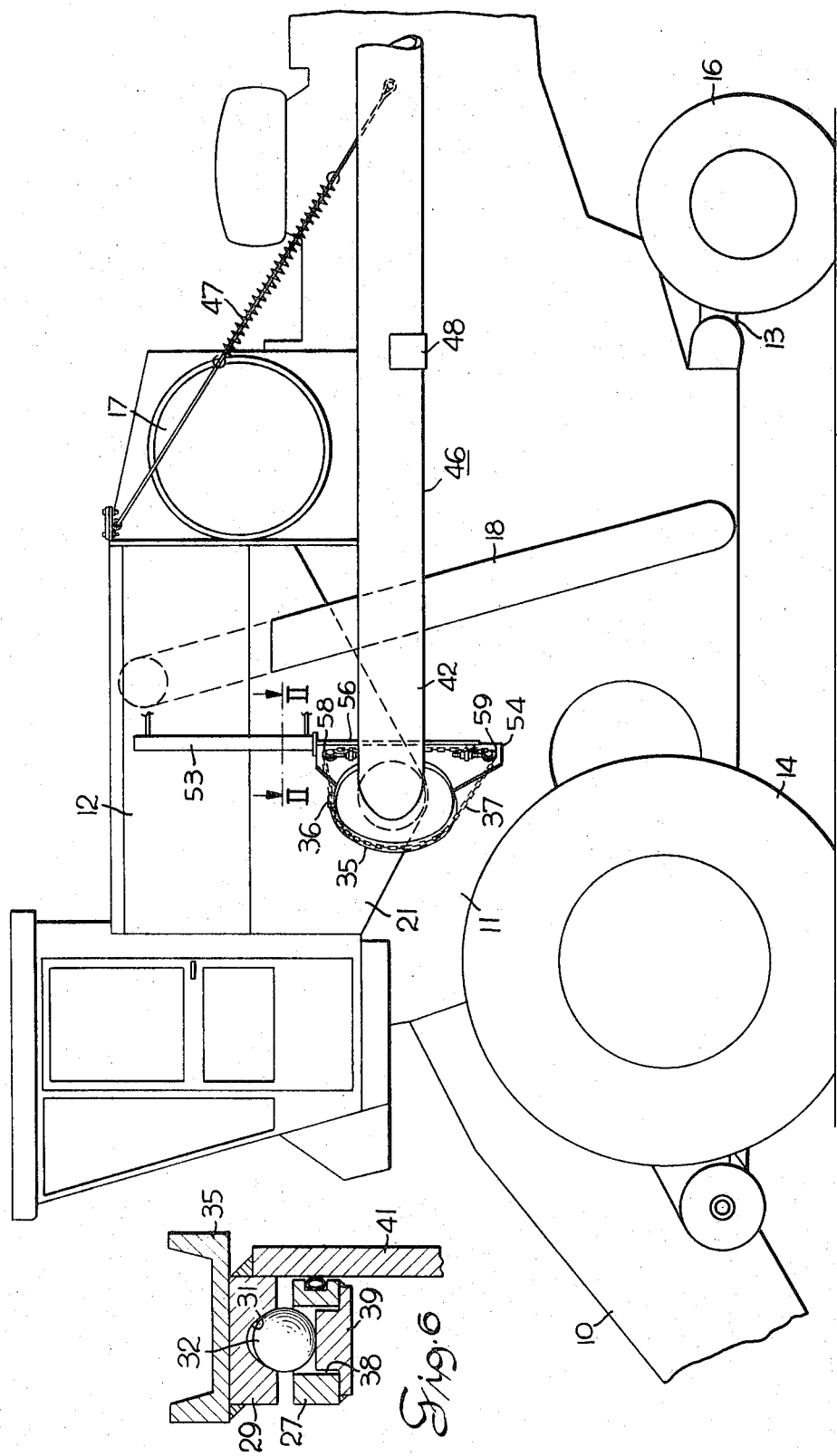
FIG. 1 is a side elevation of a combined harvester thresher embodying the invention showing an unloading auger conveyer in storage or transport position extending parallel to and alongside the harvester.
Figure 2:
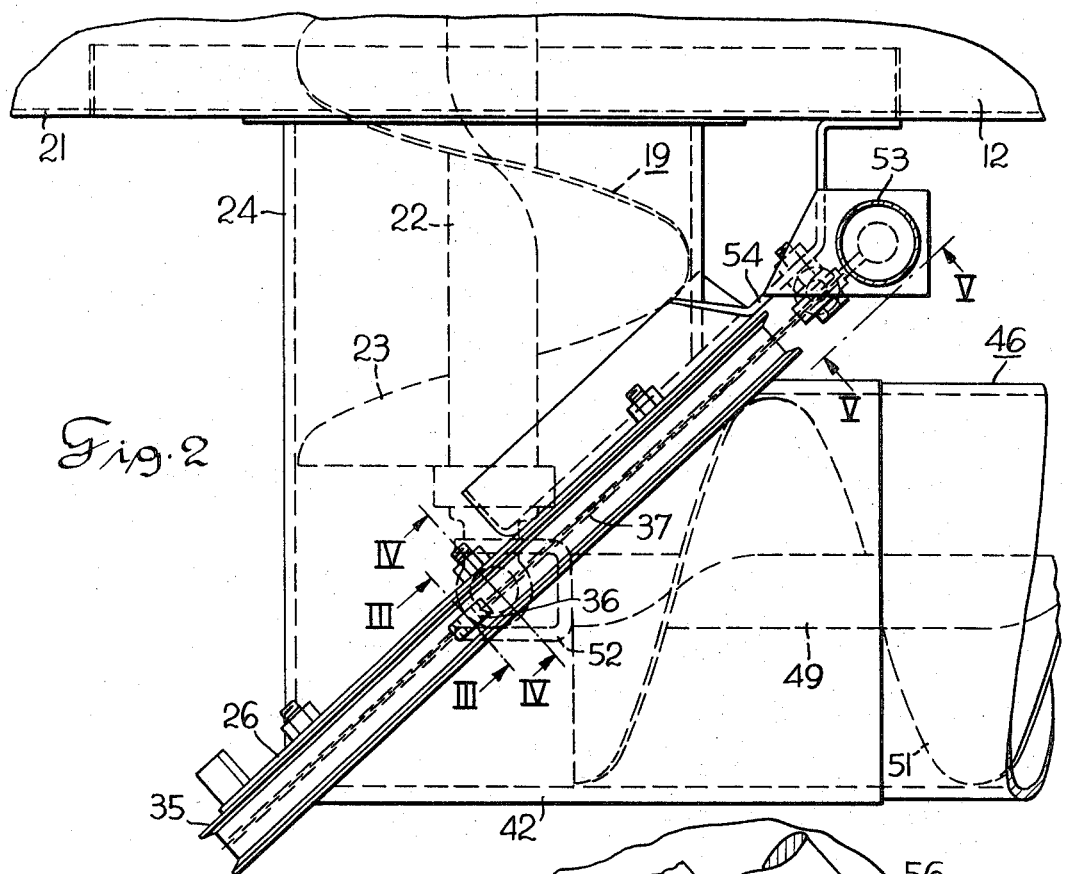
FIG. 2 is a top view partially in section taken on line II—II of FIG. 1.
Figure 3:
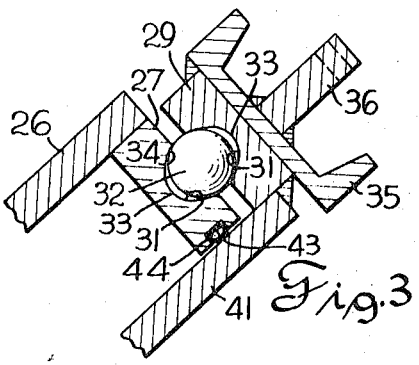
FIG. 3 is a section view taken on line III—III of FIG. 2.
Figure 4:
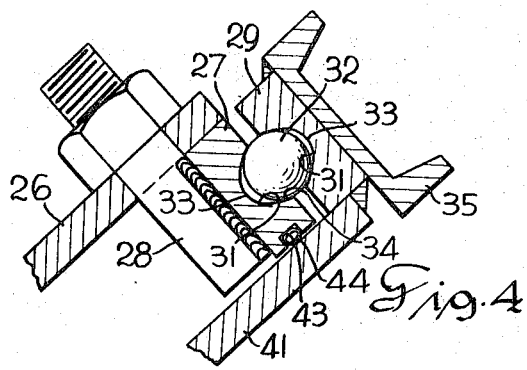
FIG. 4 is a section view taken on line IV—IV of FIG. 2.

Referring to FIG. 1, it is seen that a self-propelled harvester is provided including a cutting, conveying and threshing mechanism 10, a separating mechanism 11, and a grain or storage bin 12; all of these mechanisms being positioned on a frame structure chassis 13 carried by front traction wheels 14 and dirigible rear wheels 16. Also mounted on chassis 13 is an engine 17 operatively connected to the mentioned mechanisms by conventional means (not shown). A grain elevator 18 is mounted adjacent the discharging portion of separating mechanism 11 in grain-receiving relation thereto. Grain is moved by elevator 18 and discharged in grain bin 12. A transversely horizontally extending unloading auger-type conveyer 19 (FIG. 2) is journaled at one end in a sidewall of grain bin 12 (by means not shown). Conveyer 19 extends horizontally just above the floor of bin 12 through wall 21 thereof. The aforesaid journaled end of conveyer 19 is operatively connected to engine 17 for being driven by same by means (not shown). Conveyer 19 includes a central shaft 22 upon which auger flighting 23 is mounted. The portion of conveyer 19 which extends outwardly from grain bin wall 21 is enclosed in a tube 24 (FIG. 2) carried by wall 21. The outer end of tube 24 terminates at approximately a 45° angle facing rearwardly and this outer end of the tube 24 is turned over to provide a fastening flange portion 26. A hot rolled bar 27 (See FIGS. 3 and 4) is formed into a ring configuration and is attached to flange portion 26 by means of bolts 28 which are attached to the inner portion of bar 27 which forms an inner race. A hot rolled bar 29 is formed into a ring configuration and is positioned in surrounding relation to race 27 to form an outer race. The two races 27 and 29 are each provided with identical grooves 31 in which are received balls 32. The balls 32 that can be used in this combination are commercial grade balls of no special alloy and with no special finish or heat treatment. In other words, the most reasonably priced balls obtainable are used.

These grooves 31 which are machined into races 27 and 29 are configured to present a Gothic arch appearance so that each race provides two points of contact with each ball. In other words, the inner part 33 of each grove 31 has a radius less than a ball 32 and the outer part or sides 34 of groove 31 has a radius slightly larger than a ball 32 so that each ball can contact two points in the outer part of groove 31. Inasmuch as balls 32 are harder than the hot rolled races 27 and 29, the balls 32 soon become seated in the races with usage.

A junior channel member 35 is formed in a circle and is attached to the outer peripheral surface of race 29. Channel member 35 is provided with a ring guide element 36 to which is attached a chain 37.

Race 27 is provided with an opening 38 (FIG. 6) therethrough which is larger than balls 32 and permits easy assembly of the bearing. The races are positioned in operating position and approximately 125 balls 32 are inserted through opening 38 until a complete circle of balls which substantially contact each other are positioned in grooves 31. At this point, a plug member 39 is inserted in opening 38 and is welded to race 27 for maintaining balls 32 in position and the bearing assembled.

The periphery of plate 41 is welded to race 29 while the inner portion thereof is attached to auger extension tube 42 for movement therewith. Race 27 is provided with a slot 43 which receives a nylon seal 44 contacting plate 41.

An unloading auger conveyer 46 including tube 42 has a counter balancing spring mechanism 47 connected between tube 42 and bin 12. A strap 48 carried by chassis 13 assists in supporting conveyer 46 when the conveyer is being carried in transport position as shown in FIG. 1.

Inside tube 42 a shaft 49 (FIG. 2) is mounted. The outboard end of shaft 49 is journaled in a bearing (not shown) carried by tube 42. Auger flighting 51 is attached to shaft 49 as by welding. The inboard end of shaft 49 is attached to one end of a universal joint 52 which is attached to one end of shaft 22.

Figure 5:
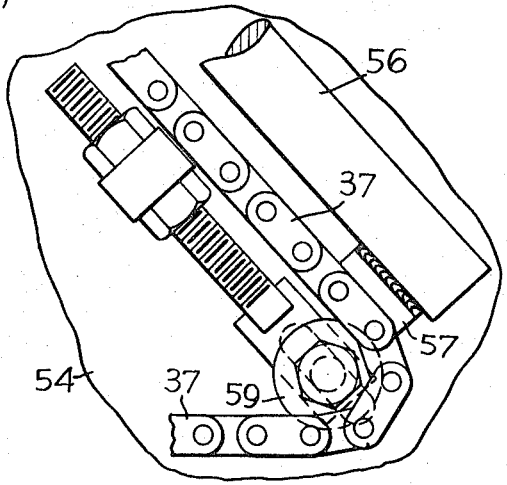
FIG. 5 is a view of the lower portion of FIG. 2 taken on line V—V.

A double acting hydraulic cylinder 53 is vertically mounted from sidewall 21 by means of a structural member 54 carried by wall 21. Hydraulic cylinder 53 is operatively connected to the hydraulic system of the harvester and can be controled from the operator's station thereof by conventional means (not shown). The distal end of the rod 56 of hydraulic cylinder 53 is connected to chain 37 by means of a plate 57 as is shown in FIG. 5.

Referring to FIG. 1, it is seen that chain 37 which is attached to ring guide element 36 on junior channel member 35 and such chain is mounted about adjustable idler pulleys 58 and 59. As shown in FIG. 1, idler pulleys 58 and 59 are mounted on structural member 54 and rod 56 is shown in its extended position with conveyer 46 positioned in its transport position extending along side the combine. Now if it is desired to extend conveyer 46 to its unloading position, the operator would activate cylinder 53 to retract rod 56 which in turn would pull upwardly on plate 57 and chain 37 to which it is connected. Such upward pull on chain 37 causes ring guide element 36 and junior channel member 35 to move counterclockwise as viewed in FIG. 2 bringing conveyer 46 up to a discharge position when hydraulic rod 56 has been retracted as far as possible.

The embodiments of the invention in which an exclusive property or privilege is claimed are defined as follows:

1. A bearing for rotatably supporting a slowly moving intermittently driven member on a stationary member, the improvement comprising an inner race for said bearing formed from a hot rolled bar into a cylindrical member with a peripheral groove therein, commercial grade balls adapted to run in said groove with two point contact with each ball, an outer race positioned in surrounding relation to said balls, said outer race being formed of a hot rolled bar formed into a cylindrical member and being provided with a groove in the inner periphery thereof configured to provide two points of contact with each of said balls so that as said driven member moves said balls will become seated in said inner and outer races, an annular flange on one of said members perpendicular to the axis of said bearing and presenting a plurality of circumferentially spaced openings therethrough near the outer periphery thereof, a plurality of circumferentially spaced and axially extending bolts rigidly secured to one of said races and having threaded ends extending through said openings, nuts on said threaded ends and means rigidly securing the other of said members to the other of said races, whereby upon removal of said nuts said other member and said bearing assembly may be separated axially from said one member.

2. In the combination recited in claim 1 and wherein said grooves are provided with a Gothic arch type of configuration so as to provide each race with two points of contact with each ball.

3. In the combination recited in claim 2 and wherein the central portion of each groove is formed with a radius slightly less than the radius of said balls and the sides of said grooves are formed with a radius slightly larger than said balls so that said balls contact portions of said sides.

4. In the combination recited in claim 1 and wherein said inner race is provided with an opening therethrough slightly larger than one of said balls so that in assembling said bearing said balls are inserted into said grooves through said opening, and means attached to said inner race for retaining said balls in said races and said bearing assembled.

5. In the combination recited in claim 1 and wherein said inner race is provided with an opening therethrough slightly larger than one of said balls so that in assembling said bearing said balls are inserted into said grooves through said opening a plug member is attached to said inner race as by welding for retaining said bearing assembled.

6. In the combination recited in claim 1 and wherein said bolts are welded to the peripheral side of said one race opposite the groove therein.

7. In the combination recited in claim 1 and wherein said grooves are symetrical with central planes at right angles to the axis of the bearing.

* * * * *